(Model.)

W. R. SMITH.
HARVESTER.

No. 276,490. Patented Apr. 24, 1883.

4 Sheets—Sheet 1.

Witnesses:
Wm. S. Duvall
N. L. Bernhard

Inventor:
Wilson R. Smith
Per Edson Bro's.
Att'ys (Model.)

W. R. SMITH.
HARVESTER.

No. 276,490. Patented Apr. 24, 1883.

4 Sheets—Sheet 3.

Witnesses:
Wm S Duvall
O L Bernhard

Inventor:
Wilson R Smith
Per Edson Bro's,
Attys.

(Model.)

4 Sheets—Sheet 4.

W. R. SMITH.
HARVESTER.

No. 276,490. Patented Apr. 24, 1883.

Witnesses
William H. Holcombe
Clifford A. Holcombe

Inventor
Wilson R. Smith

United States Patent Office.

WILSON R. SMITH, OF BELOIT, WISCONSIN, ASSIGNOR OF ONE-HALF TO CHESTER A. HODGE, OF SAME PLACE.

HARVESTER.

SPECIFICATION forming part of Letters Patent No. 276,490, dated April 24, 1883.

Application filed October 16, 1882. (Model.)

*To all whom it may concern:*

Be it known that I, WILSON R. SMITH, a citizen of the United States, residing at the city of Beloit, in the county of Rock and State of Wisconsin, have invented certain new and useful Improvements in Harvesting-Machines, of which the following is a specification.

My invention relates to improvements in reaping or harvesting machines in which the cut grain is sized in uniform bundles by a reel. The bundle is kept from the floor of the platform by ribs, and is raked to one side by a rake having a lateral movement in relation to the line of travel; and the novelty consists in the construction and arrangement of parts, as will be more fully hereinafter set forth.

The objects of my invention are, first, to make the bundles of equal size on the platform, and, second, to carry the bundle so sized to the binders or to drop it to the ground without the aid of elevators or aprons. I accomplish these objects by the mechanism illustrated in the accompanying drawings, in which—

Figure 1:
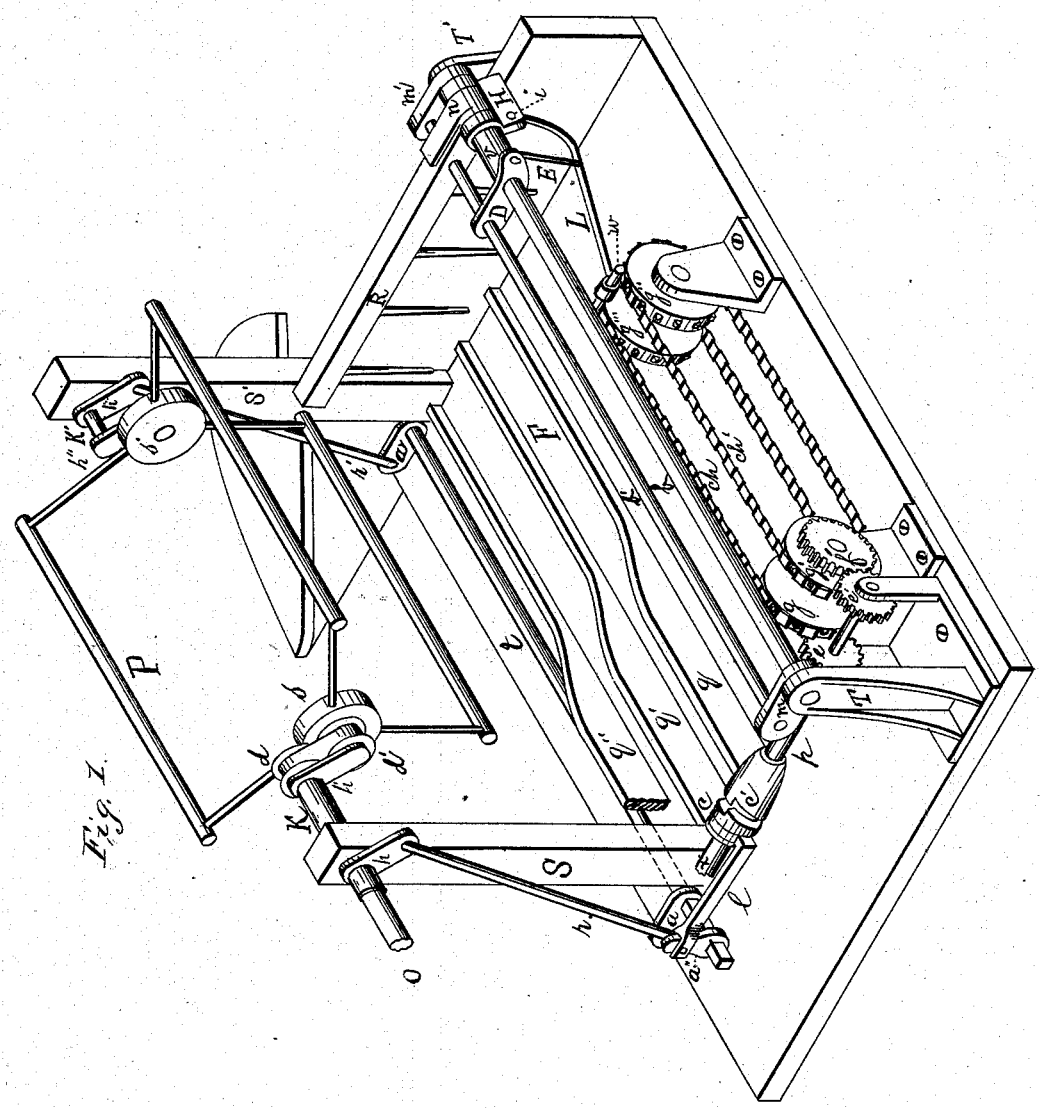
Figure 2:
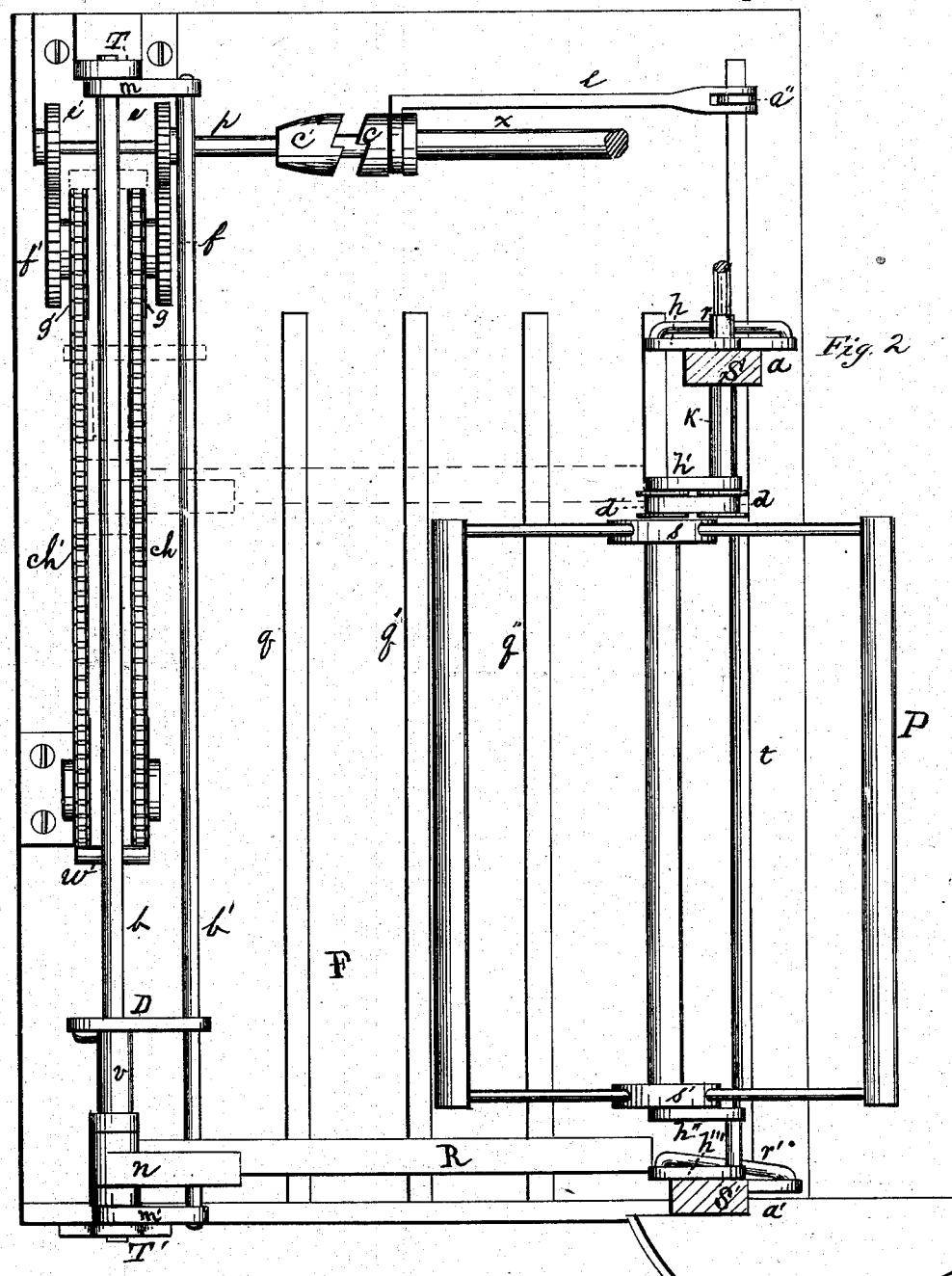
Figure 3:
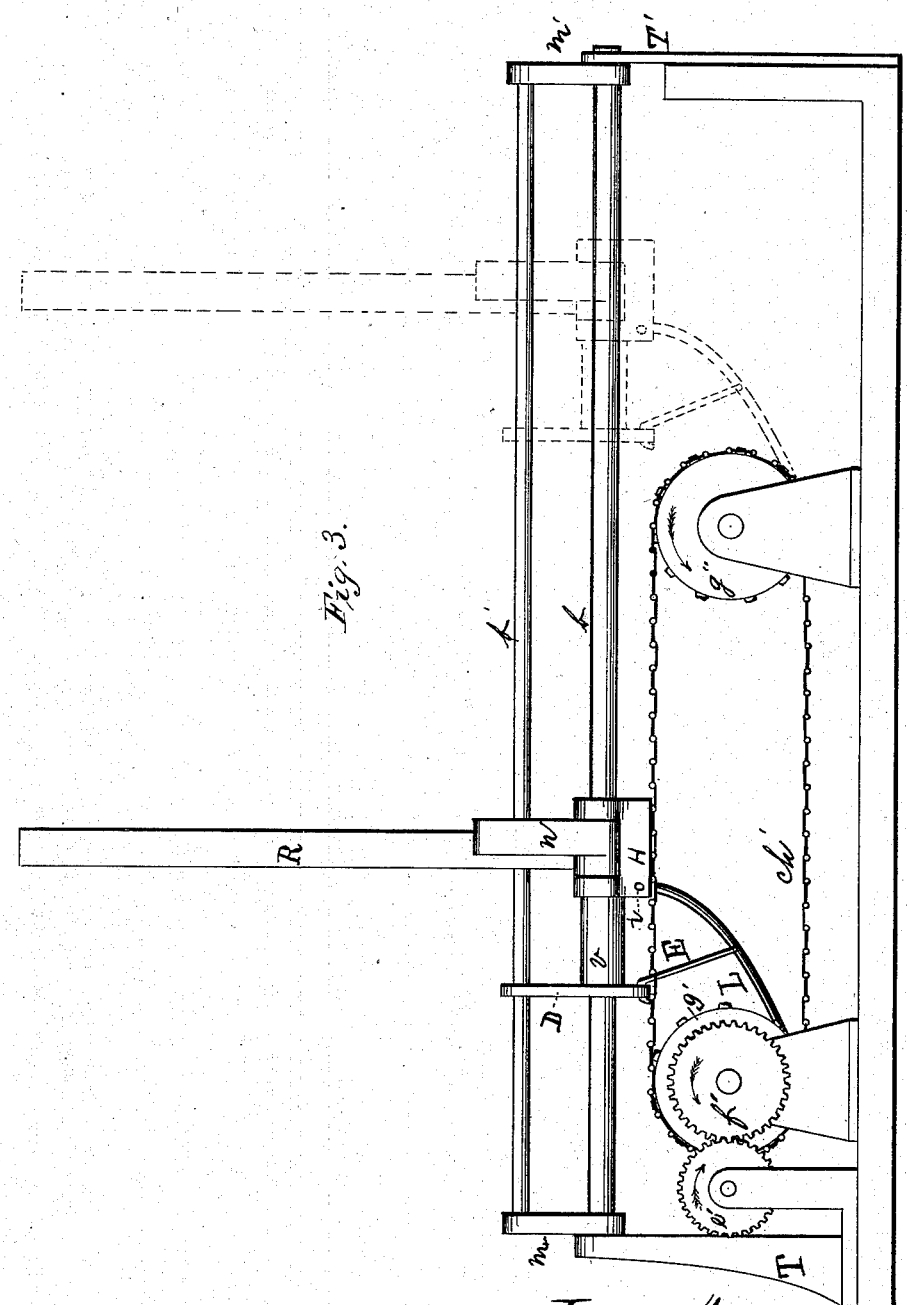
Figure 4:
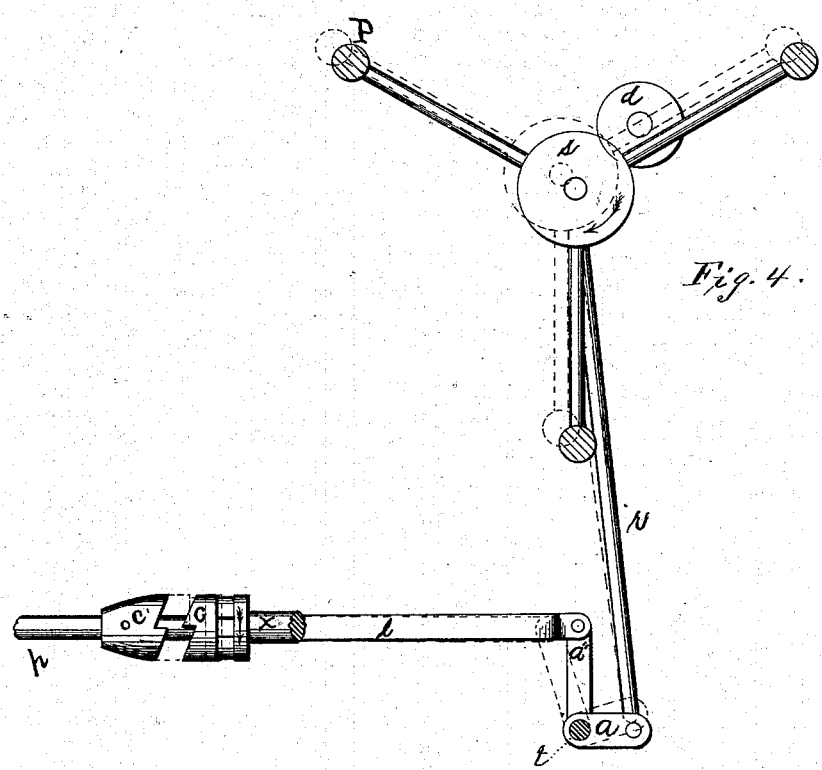

Figure 1 is a perspective view of the machine, the rake being down and at rest. Fig. 2 is a top view with the rake in the same position, the dotted lines showing the point to which the rake travels across the machine-platform. Fig. 3 is a rear view with the rake at the completion of its stroke and elevated, ready for the return movement, the dotted lines showing the point to which it is returned. Fig. 4 is a side elevation, partly in section, of the reel, showing also the clutch mechanism connected therewith.

Similar letters refer to like parts in the different views.

S S represent two standards, which are secured to the platform F, near the front thereof.

K designates a sleeve or hollow shaft, upon which are rigidly secured parallel arms $h\ h'$.

K' is a solid shaft, loosely journaled in the standard S', and provided with rigid arms $h''$ and $h'''$, arranged parallel with the arms $h\ h'$. The reel-hubs $s$ and $s'$ are hung loosely on horizontal pins or bearings rigid with the arms $h'\ h'''$, and the reel P, consisting of the hubs, radial arms, and bats, is revolved by means of the shaft O, passed through the sleeve K, and carrying a pulley, $d$, belted to a pulley, $d'$, which is secured to and revolves with the hubs $s$. The outer arms, $h$ and $h'''$, are connected by rods $r$ and $r'$, respectively, to arms $a$ and $a'$, rigid with a rock-shaft, $t$, the said rock-shaft having also a rigid arm, $a''$, arranged at about right angles with the arms $a$ and $a'$. To this arm $a''$ is pivoted a link, $l$, which engages a sliding clutch, $c$, splined on the continuously-rotating shaft $x$ in the ordinary manner, and forces the said clutch into or out of engagement with its fellow portion $c'$, which is rigid upon the shaft $p$, which carries securely keyed to it the spur-wheels $e$ and $e'$. These spur-wheels drive another pair, $f$ and $f'$, which, by separate shafts, are connected with their respective sprocket-wheels $g$ and $g'$, between which there is a space to allow the wrist-pin $w$ and pitman L to pass. Passing over the sprocket-wheels $g\ g'\ g''$ and $g'''$ are two endless chains. $ch$ and $ch'$, which carry the wrist-pin $w$, upon which pin is pivoted the pitman L, which is connected with the rake-carrier H by a pin, $i$. The rod E is attached to the pitman L and to the rake-head, which last consists of the bar D, sleeve $v$, rigidly connected therewith, and the rake-socket $n$. These parts of the rake-head, together with the rake-carrier H, move laterally on two parallel rods or bars, $b$ and $b'$. The bar $b$ is supported by standards T and T', and carries the arms $m$ and $m'$, which are fastened rigidly to and carry the rod $b'$.

R is a rake provided with a suitable number of teeth. $q\ q'\ q''$ are ribs fastened to the platform F.

In operating my machine the cut grain is thrown back upon the ribs $q\ q'\ q''$ on the platform F by an ordinary harvester-reel. (Not shown.) The reel P revolves, with its bats, at a certain distance above the platform until a sufficient quantity of grain for a bundle has accumulated on the platform, when the resistance of this grain to the bats raises the reel and its hangers $h'$ and $h''$. These, being rigidly connected with the outside arms, $h$ and $h'''$, raise them and lift the arms $a$ and $a'$ by the rods $r$ and $r'$, which movement rocks the shaft $t$ and throws the clutch $c$ into gear with the clutch $c'$ by means of the arm $a''$ and link $l$.

The motion of the spur-wheels e and e', seated upon and fastened to the shaft p (on which is also the clutch c',) is communicated to the sprocket-wheels g g' and the endless chains ch and ch'. These draw the wrist-pin w, pitman L, rake-carrier H, and rake R to the left side of the machine, delivering the grain at that point, ready to be bound by hand or by automatic binder, or to be dropped upon the ground. As long as the chains ch and ch' carry the wrist-pin w on a line drawn along the upper edge of the sprocket-wheels g, g', g'', and g''' the rake R remains down parallel to the platform, pushing the gavel along and passing under the reel-bats; but when the chains carry the wrist-pin downward over the sprocket-wheels g and g' the pitman L in its descent draws down the rod E and the rear end of the bar D, which movement elevates the parallel bar b' and the rake R into the position shown in Fig. 3. In this position the rake is carried back to the outer side of the machine by the travel of the chains ch and ch' and wrist-pin w, along the lower line of the sprocket-wheels, and is dropped by the upward movement of the wrist-pin w into its horizontal position. At this point the clutch c is thrown out of gear by a suitable device, and the rake is left at rest until the accumulation of grain for another bundle throws the clutch again into gear, when the laterally-raking movement, elevation of rake, and return travel are repeated.

Dotted lines in Figs. 2 and 3 show the range of travel of the rake from one side to the other. Dotted lines in Fig. 4 show the position of the reel and its connections when by the elevation of the reel the clutches c and c' are thrown into gear.

The reel P acts as an aid to the harvester-reel, and has instead of a continuous center shaft pins or pivots on the two hubs s and s', which arrangement allows the reels to be made smaller and to be hung lower, because when constructed in this manner there is no continuous center shaft to push or throw the grain before it and away from the machine.

Heretofore in automatic reaping and harvesting machines carrying the grain on elevators or aprons the bundles have been sized by packers having a reciprocating motion; or where self-rakes have been used the bundles are left of unequal sizes, because the distance traveled over the ground by the machine, not the heaviness of the grain, determines the size of the gavel.

In my machine all bundles are raked of equal size, and they are made so on the platform without the use of elevators. The ribs q q' q'' (more or less) facilitate the raking of the grain across the platform by allowing the rake-teeth to always go below the straw, thereby admitting a clean sweep at every side movement of the rake.

Having described my invention, what I claim, and desire to secure by Letters Patent, is—

1. In a harvester, the combination of the grain-platform, the standards S S', the driving-shaft mounted in one standard and the short shaft mounted in the same axial line in the other standard, the reel hung on said shafts at one side of their axial line, and adapted to be elevated by the grain accumulated on the platform, means, substantially as described, for imparting motion from the driving-shaft to the reel, means for removing the accumulated grain, clutch mechanism connected therewith, and intermediate devices through which the elevation of the reel will engage said clutch, whereby bundles are formed of uniform size.

2. The combination of the driving-shaft O, tubular shaft K, having arms h h', shaft K', having arms h'' h''', the yielding reel P, and the pulleys d d', substantially as and for the purpose set forth.

3. The combination of the tubular shaft K, shaft K', arms h' h'', reel P, hung upon pins on said arms, and adapted to be raised by the grain upon the platform, the driving-shaft O, means for transmitting motion to the reel, the arms h h''', rods r r', rock-shaft t, means for operating the rake, and intermediate mechanism, whereby the rake is put in operation, substantially as and for the purpose set forth.

4. In a harvester, the combination of the yielding reel P, driving-shaft O, shafts K K', provided with arms h h' h'' h''', rods r r', rock-shaft t, having arms a a' a'', link l, clutches c c', and rake-actuating mechanism, substantially as and for the purpose described.

5. In a harvester, the platform-rake, the rake-head D v n, the carrier H, the bars b b', arms m m', rod E, pitman L, wrist-pin w, chains ch ch', and actuating mechanism, all constructed, arranged, combined, and operating substantially as set forth.

5. In a harvester substantially as described, the combination of the yielding reel P, the rock-shaft t, mechanism connecting the same, the shipper-rod, the clutch mechanism, the rake-actuating shaft, the gear-wheels, the sprocket-wheels and chains, and the rake-carrier connected to said chains in such a manner as to cause the rake to traverse close to the platform in one direction and be elevated above the same on its return movement, substantially as and for the purpose set forth.

WILSON R. SMITH.

Witnesses:
 WILLIAM H. HOLCOMBE,
 CLIFFORD A. HOLCOMBE.